United States Patent [19]

Shekher

[11] Patent Number: 5,244,170
[45] Date of Patent: Sep. 14, 1993

[54] PASSIVE NONLINEAR INTERFACE STRUT (PNIS)

[75] Inventor: Vinod Shekher, Huntsville, Ala.

[73] Assignee: General Dynamics Corporation, Space Systems Division, San Diego, Calif.

[21] Appl. No.: 776,159

[22] Filed: Oct. 15, 1991

[51] Int. Cl.$^5$ .................... B64D 47/00; F16F 09/00; B60G 11/34

[52] U.S. Cl. ................. 244/158 R; 244/54; 244/118.1; 267/69; 267/28

[58] Field of Search .................. 244/118.1, 137.4, 54, 244/158 R; 267/69, 70, 71, 73, 74, 158, 164, 174, 166, 178, 28, 29; 188/380; 248/564, 565

[56] References Cited

U.S. PATENT DOCUMENTS

| | | | |
|---|---|---|---|
| 2,195,685 | 4/1940 | Schneider | 267/70 |
| 3,343,858 | 9/1967 | Rice | 267/70 |
| 3,547,375 | 12/1970 | Mackey | 244/158 R |
| 3,735,952 | 5/1973 | Platus et al. | 248/358 R |
| 3,910,533 | 10/1975 | Cheatham et al. | 244/161 |
| 4,324,374 | 4/1982 | Wittmann et al. | 244/158 R |
| 4,351,515 | 9/1982 | Yoshida | 188/380 |
| 4,355,469 | 10/1982 | Nevins et al. | 33/185 R |
| 4,400,885 | 8/1983 | Consales | 33/185 R |
| 4,511,115 | 4/1985 | Ludwigsen | 248/562 |
| 4,536,114 | 8/1985 | Belew | 410/156 |
| 4,673,170 | 6/1987 | Dykema | 188/380 |
| 4,700,817 | 10/1987 | Kondo et al. | 188/380 |
| 4,776,539 | 10/1988 | Byers et al. | 244/158 R |
| 4,929,009 | 5/1990 | Vandersluis et al. | 294/2 |

FOREIGN PATENT DOCUMENTS 1434190 10/1988 U.S.S.R. ............... 267/174

OTHER PUBLICATIONS

NASA Tech Briefs, Jun. 1989, Associated Business Publications Co., Inc. New York, N.Y., pp. 77-78.

*Primary Examiner*—Joseph F. Peters, Jr.
*Assistant Examiner*—Virna Lissi Ansley
*Attorney, Agent, or Firm*—John R. Duncan; Frank D. Gilliam

[57] ABSTRACT

A passive load limiting strut particularly useful in limiting loads between a spacecraft and an upper stage during booster first stage operation and thereby permit the launching of heavier spacecraft. The strut operates on the principle of snap through buckling of bar linkages. A tension shaft is telescoped into a compression shaft within a housing. A plurality of bar linkages are connected between each of the shafts and the housing, the bars being oriented at an acute angle in the direction of the tension shaft. In tension, the bar linkages connected to the tension shaft progressively buckle, absorbing tension loads. In compression, the bars connected to the compression shaft progressively buckle, absorbing compression loads. A compression spring intermediate the ends of the shafts further aids in load relief. Collars on the shafts prevent the shafts moving beyond preselected locations.

5 Claims, 2 Drawing Sheets

PASSIVE NONLINEAR INTERFACE STRUT (PNIS)

BACKGROUND OF THE INVENTION

This invention relates in general to load limiting struts and, more specifically, to a passive nonlinear support strut particularly useful as supports for spacecraft on an upper stage during first stage launch vehicle ascent.

A variety of different load alleviating supports have been developed for reducing adverse effects of varying loads on structures. Typical of these are automotive-type shock absorbers, various hydraulic cylinders and the like. These systems are effective in lightly loaded, single load direction applications such as automobiles and the like, but are not capable of accommodating very large loads and loads that vary in both compression and tension.

More complex variable struts, such as that described by Belew in U.S. Pat. No. 4,536,114, have been developed for space applications such as truss and beam structures. These systems tend to be complex, have a number of active components and are not always sufficiently reliable for high load launch vehicle applications.

Snap through buckling structures in which bars are caused to buckle between two configurations are effective in alleviating loads that occur sequentially in opposite directions. Such systems are described by Farley et al in NASA Technical Briefs magazine, June 1989 at page 77. This is a very advantageous technique, although it is not capable of effectively absorbing intermittent compressive and tensile loads. Similarly, Belville washer assemblies function as a passive structure capable of alleviating compression loads. However, these assemblies are not fully effective in reacting both compressive and tensile loads and do not provide desirable redundancy and simplicity.

A particularly difficult application for load limiting struts occurs where an upper stage carrying a heavy spacecraft is launched on an initial stage, such as a space shuttle or the like. Initial stage ascent forces can impose forces from the spacecraft onto the upper stage that are beyond the structural capability of the upper stage to react. During first stage lift-off and ascent flight operation, concentrated loads are imposed on the spacecraft to upper stage interface, while after engine cut off tension forces are imposed, all of which must be accommodated by the interface struts. One end of each of the spacecraft and upper stage can be rigidly fastened to the launch vehicle, i.e. to the cargo bay structure of a space shuttle or the like. The other end of each of the upper stage and spacecraft must have some freedom of movement in the vehicle axial direction to accommodate the re-distribution of induced loads. Present strut and load relieving systems as described above have limited load carrying capability, and have insufficient reliability, especially in the case of active load alleviation systems.

Thus, there is a continuing need for improved load alleviating system of improved simplicity and reliability that are capable of reacting large loads in both compression and tension in severe environments, such as space launch vehicle systems.

SUMMARY OF THE INVENTION

It is, therefore, an object of the present invention to provide a passive nonlinear support strut having improved reliability and simplicity. Another object is to provide such a strut that is capable of reacting loads in both compression and tension. A further object is to provide such a strut that is particularly suitable in use for supporting a heavy spacecraft safely on an upper stage during the first stage launch vehicle ascent.

The above-noted objects, and others, are accomplished in accordance with this invention by an interface strut system which comprises a tension shaft and a compression shaft in a telescoped, coaxial, relationship, with a housing surrounding the telescoped ends. Several spring bars are connected between the tension shaft and the housing and the compression shaft and the housing, all of the bars aligned at acute angles to the direction in which the tension shaft passes through the housing. A collar on the tension shaft outside the housing limits movement of the tension shaft inwardly of the housing, while a collar on the compression shaft within the housing limits movement of the compression shaft outwardly of the housing. A spring assembly between the telescoped shaft ends biases them apart in normal, unloaded, conditions.

In operation, when tension loads are imposed on the ends of the shafts, the tension shaft is pulled outwardly of the housing, causing the bars connected thereto to absorb energy by buckling in a controlled manner. When compression loads are imposed on the ends of the shafts, the compression shaft is forced inwardly of the housing, causing controlled buckling of the bars connected to the compression shaft, limiting transient loads on the system.

BRIEF DESCRIPTION OF THE DRAWING

Details of the invention, and preferred embodiments thereof, will be further understood upon reference to the drawing, wherein.

DETAILED DESCRIPTION OF PREFERRED EMBODIMENTS.

Figure 1:
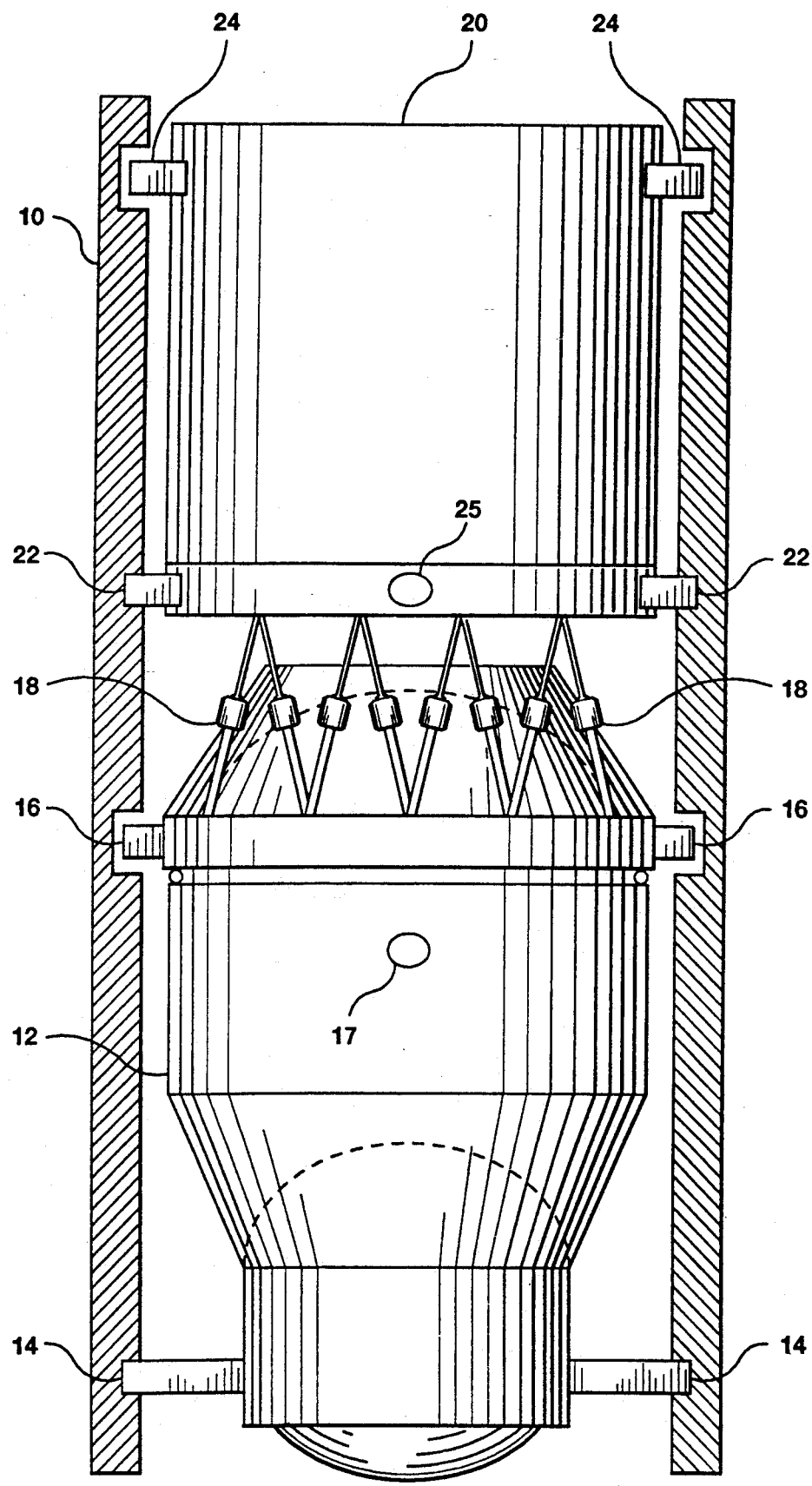
FIG. 1 is a schematic elevation view of an upper stage and spacecraft with the load limiting system of this invention.

Referring now to FIG. 1 there is seen a schematic representation of a shell 10, which could, for example, be the payload fairing of an expendable launch vehicle, the Space Shuttle cargo bay or the bay of an unmanned Space Shuttle derivative, such as the Shuttle-C. An upper stage 12, such as a Centaur vehicle, is supported on the shell 10 at 14 by a connection that resists X and Z reactions, at 16 by a connection that resists Z reactions and a connection 17 that reacts Y reactions. A plurality of passive nonlinear interface struts 18 attach a spacecraft 20 to upper stage 12. Spacecraft 20 is connected to shell 10 by connections 22 that resist X and Z interface reactions, at 24 by connections that resist Y interface reactions and at 25 by connections that resist spacecraft Y reactions. As is schematically shown, the connections at 16 and 24 are not rigid because they are free to move in the X direction. The upper state 12 is allowed, at interconnection 16, to move freely in the X direction. Thus, struts 18 must accommodate changing loads between the upper stage 12 and spacecraft 20 during first stage launch vehicle ascent, which may include transient tension and compression forces. The struts accommodate all loads during the upper state engine burn.

The passive nonlinear strut 18 operate on the principle of snap through buckling of a bar linkage as schematically illustrated with two bars in FIGS. 2A through 2D. A linear tension spring 30 is connected between a stationary point 31 (which could be either spacecraft 20 or upper stage 12) and the common end of bars 32. The second, spaced, ends of bars 32 are attached to a fixed structure 34 such as a housing as detailed below. A movable structure (which could be the other of the spacecraft 20 or upper stage 12) is connected to the common ends of bars 32 at 36.

Figures 2A, 2B, 2C, 2D:
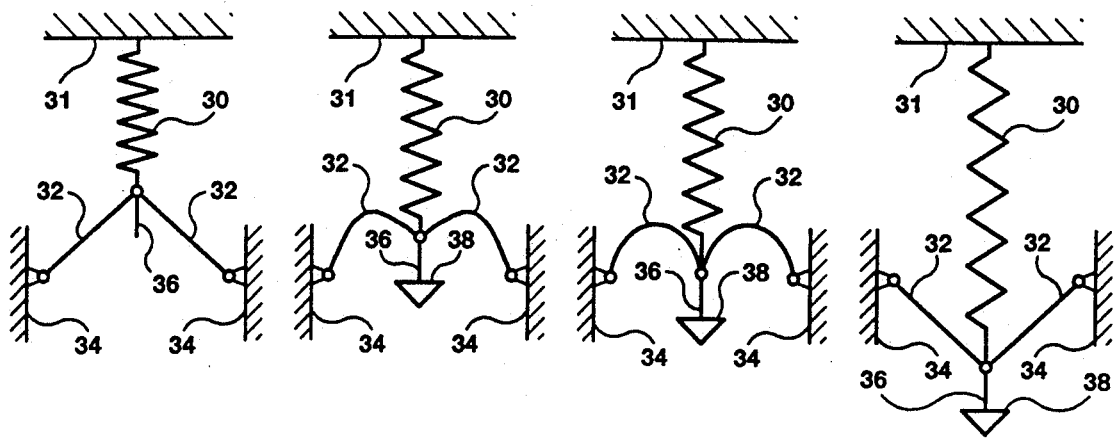
FIG. 2A is a schematic diagram of the bar linkage in the unloaded state.
FIG. 2B is a schematic diagram of the bar linkage after the initial load is applied and bar deformation has begun.
FIG. 2C is a schematic diagram of the bar linkage as collapse begins under increased load.
FIG. 2D is a schematic diagram of the bar linkage in the post snap through position.

In the initial, unloaded, condition bars 32 are straight as seen in FIG. 2A. As a tension force is introduced between structures 31 and 36, as indicated by arrow 38, bars 32 begin to deform as shown in FIG. 2B. Resistance to the applied load comes primarily from the membrane stiffness of the bars 32 and the stiffness of spring 30. As the load indicated by arrow 38 continues to increase, the state shown in FIG. 2C is reached and collapse begins. With slight further increase in load, the bars 32 snap through and reach the state shown in FIG. 2D.

The restoring force in spring 30 acts as a compressive load opposite in direction to arrow 38 will return the bars 32 to the position of FIG. 2A. Energy will be absorbed in a similar manner as the bars deform and snap through to the original position. Resistance to load is highest at the position shown in FIG. 2B (with either tension or compression forces) and lowest at the position shown in FIG. 2D. As detailed below, the principle illustrated in FIGS. 2A-2D be used with two opposing sets of bars 32 to support both tension and compression loads. Preferably, deformation of bars 32 is limited to the state shown, approximately, in FIG. 2C, so that full snap through to the state shown in FIG. 2D is prevented.

Figures 3A, 3B, 3C:
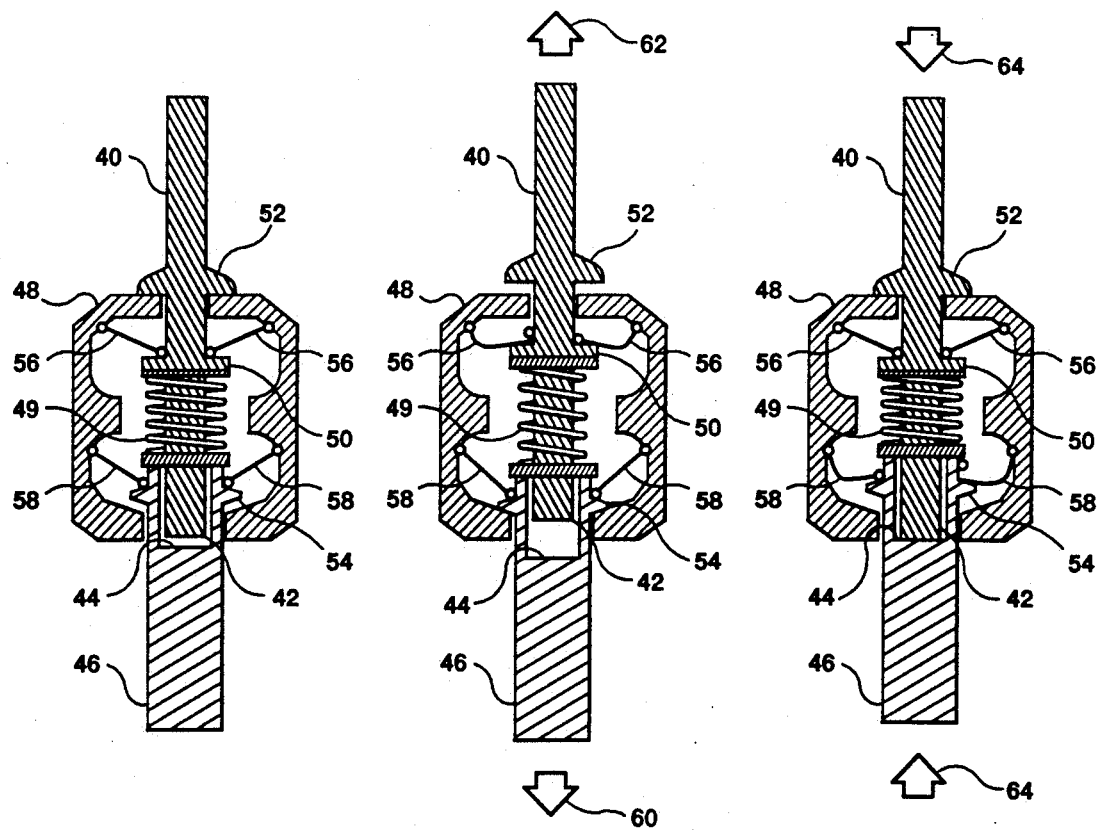
FIG. 3A is a schematic partially cut away axial view of the interface strut system in the unloaded state.
FIG. 3B is a schematic partially cut away axial view of the interface strut system in tension.
FIG. 3C is a schematic partially cut away axial view of the interface strut system in compression.

Details of a passive nonlinear interface strut accommodating both tension and compression forces is illustrated in FIGS. 3A-3C. The assembly includes a tension shaft 40 having a first end 42 telescoped into an axial opening 44 in a first end of a compression shaft 46. A housing 48 surrounds the first ends of shafts 40 and 46. Housing 48 may typically be split axially and fastened together by conventional bolts (not shown) to allow convenient assembly of the apparatus.

A spring assembly 49 is positioned around tension shaft 40 between a shoulder 50 on shaft 40 and the first end of compression shaft 46 adjacent to hole 44. Fasteners and washers or other bearing material is preferably included to attach the spring assemblies to tension and compression shafts and provide a bearing against the ends of spring 49.

A collar 52 is fixed to tension shaft 40 to limit movement of shaft 40 inwardly of housing 48. A collar 54 is fixed to compression shaft 46 within housing 48 to limit movement of shaft 46 outwardly of housing 48. While these collars should be fixed to the shafts, if desired they could be made adjustable such as by cooperating threads, and locked in a desired location for use.

A first plurality of bars 56 is secured at one end to housing 48 and the other end to tension shaft 40 adjacent to shoulder 50, with the bars lying at an acute angle to the outer portion of shaft 40. A second plurality of tension bars 58 is secured at one end to the inner wall of housing 48 and at the other end to compression shaft 46 adjacent to collar 54, with these bars also lying at an acute angle to the outer portion of tension shaft 40. Generally, bars 56 and 58 are substantially evenly spaced around shafts 40 and 46, respectively.

As seen in FIG. 3A, in the normal unloaded position all of the bars 56 and 58 are straight and unloaded, shoulder 54 is in contact with the inner wall of housing 48 and shoulder 52 is in contact with the outer wall of housing 48 and spring 49 is unloaded.

When tension is applied to the assembly as indicated by arrows 60 in FIG. 3B, shoulder 54 on shaft 46 remains in contact with the inner wall of housing 48 but tension shaft 40 begins to move collar 52 away from the outer wall of housing 48. This movement stretches spring 49, absorbing some load, and begins to collapse bars 56, absorbing considerable load. Collapse of bars 56 is limited by eventual contact of shoulder 50 and the adjacent bar mounts with the inner wall of housing 48. If desired, an additional adjustable shoulder or ring could be secured to shaft 40 above shoulder 50 to limit outward travel of shaft 40. In general, it is preferred that the collapse of bars 56 be limited to a state similar to that shown in FIG. 2C, just short of snap through. When the tension load dissipates, spring 49 will assist in returning the assembly to the state shown in FIG. 3A.

FIG. 3C shows the assembly reacting a compression load indicated by arrows 64. Here, shoulder 52 remains in contact with the outer wall of housing 48, preventing further inward movement of shaft 40. Shaft 46 moves inward, compressing spring 49 and deforming bars 58. Preferably, the end 42 of shaft 40 will encounter the bottom of hole 44 to limit collapse of bars 58 to a state substantially as shown in FIG. 2C, without full snap through. Once the compression load is alleviated, spring 49 will assist in returning the assembly to the state shown in FIG. 2A.

This system is, thus, capable of alleviating both tension and compression loads of the sort encountered by spacecraft and their associated upper stages during first stage launch vehicle operation.

Other applications, variations and ramifications of this invention will occur to those skilled in the art upon reading this specification. Those are intended to be included within the scope of this invention as defined by the appended claims.

I claim:

1. A passive non-linear interface strut system which comprises:
   a compression shaft;
   a tension shaft coaxial with said compression shaft and having a first end telescoped into a first end of said compression shaft;
   a housing surrounding said first ends of said compression and tension shafts;
   an intermediate spring means surrounding the first end of said tension shaft and connected between said first ends of said tension and compression shafts;

a collar fixed to said compression shaft limiting movement of said compression shaft outwardly of said housing;

a collar fixed to said tension shaft limiting movement of said tension shaft inwardly of said housing;

a first plurality of bar linkages having first ends secured to said tension shaft and second ends secured to the interior of said housing, said bars oriented at an acute angle in the direction of said tension shaft; and a second plurality of bar linkages having first ends secured to said compression shaft and second ends secured to the interior of said housing, said bars oriented at an acute angle in the direction of said tension shaft.

2. The strut system according to claim 1 further including means for limiting movement of said tension shaft outwardly of said housing.

3. The strut system according to claim 2 wherein said means for limiting movement of said tension shaft includes a shoulder positioned to contact said housing to prevent buckling of said bars to the point of snap through.

4. The strut system according to claim 1 further including means for limiting movement of said compression shaft inwardly of said housing.

5. The strut system according to claim 4 wherein said means for limiting movement of said compression shaft includes the bottom of said hole located at a position relative to the telescoped end of said tension shaft so that said telescoped end abuts the bottom of said hole to limit buckling of said second plurality of bars to a point preceding snap through.

* * * * *